United States Patent

Betz et al.

[11] Patent Number: 5,329,814
[45] Date of Patent: Jul. 19, 1994

[54] APPARATUS FOR TURNING A BODY TO BE BALANCED INTO A WORKING POSITION

[75] Inventors: Jürgen Betz; Jürgen Kissinger; Peter Heydt, all of Griesheim, Fed. Rep. of Germany

[73] Assignee: Dr. Reutlinger and Sohne Gmbh & Co. KG, Darmstadt, Fed. Rep. of Germany

[21] Appl. No.: 75,820

[22] Filed: Jun. 11, 1993

Related U.S. Application Data

[63] Continuation of Ser. No. 660,524, Feb. 25, 1991, abandoned.

[30] Foreign Application Priority Data

Mar. 5, 1990 [DE] Fed. Rep. of Germany ....... 4006867

[51] Int. Cl.$^5$ ............................................. G01M 1/22
[52] U.S. Cl. .................................................. 73/462
[58] Field of Search ................. 73/460, 462, 473, 475, 73/476, 464, 487; 340/683, 686

[56] References Cited

U.S. PATENT DOCUMENTS

| | | | |
|---|---|---|---|
| 3,835,712 | 9/1974 | Muller | 73/462 |
| 4,046,017 | 9/1977 | Hill | 73/462 |
| 4,160,384 | 7/1979 | Guyot et al. | 73/462 |
| 4,214,481 | 7/1980 | Reutlinger | 73/462 |
| 4,298,948 | 11/1981 | Davis | 73/462 |
| 4,464,934 | 8/1984 | Giers | 73/462 |
| 4,475,393 | 10/1984 | Reutlinger | 73/462 |
| 4,868,762 | 9/1989 | Grim et al. | 73/462 |
| 5,089,969 | 2/1992 | Bradshaw et al. | 73/460 |

Primary Examiner—Hezron E. Williams
Assistant Examiner—Michael J. Brock
Attorney, Agent, or Firm—Mallinckrodt & Mallinckrodt

[57] ABSTRACT

The unbalance of a body (10) to be balanced is indicated in a polar co-ordinate system (52) on a screen (50) of a cathode ray tube (48) by means of a first visible mark (60). The body (10) to be balanced may be rotated by a drive motor (20) by means of a belt (22). A pulse generator (30), producing trains of pulses that are relatively phase displaced by a quarter of a period, is coupled to the drive motor (20). A computer (34) generates a position-indicating signal from the pulse trains, and a reference signal is produced by a reference mark on the body (10) to be balanced and obtained from a pick-up device (28). A position-indicating radial finger (68), which is a second visible mark and rotates on the screen (50) in phase locked manner with the body (10) to be balanced, is obtained from the position-indicating signal. When the position-indicating radial finger (68) coincides with the first visible mark (60), the unbalanced body (10) is positioned in the desired working position. It is possible to depict on the screen (50) angular positions of unbalance even though the rotation of the body (10) to be balanced is not phase-locked with the rotary drive by the motor (20), because, unlike the prior art which merely counts pulses, the respective ratios of the number of pulses generated by movement of the body (10) from the reference position thereof to sequential momentary positions thereof in relation to the number of pulses in a complete revolution of the rotating body (10) to be balanced is determined and used instead.

11 Claims, 1 Drawing Sheet

APPARATUS FOR TURNING A BODY TO BE BALANCED INTO A WORKING POSITION

This is a continuation of U.S. application Ser. No. 07/660,524, filed Feb. 25, 1991, now abandoned.

BACKGROUND OF THE INVENTION

1. Technical Field

The present invention relates to apparatus for and methods of locating and correcting unbalance in a body to be balanced. In its more particular aspects, the invention provides apparatus and method for measuring an unbalance in a body to be balanced by displaying on a screen representations of positions of the body as it rotates.

2. State of the Art

The process of balancing a rotor comprises two steps. The first step consists in measuring the unbalance in terms of its angular position and its magnitude during a test cycle. The second step consists in balancing out the unbalance determined during the test cycle by removing or adding material at particular points on the body to be balanced In the case of "polar balancing" the balancing must be effected in each balancing plane at the position which corresponds to the angular position of unbalance discovered during the test cycle. Consequently, it is necessary to rotate the body to be balanced into the corresponding working positions for correcting the unbalance.

For each working position, the part of the body at which material must be removed or added must be suitably placed for such a corrective operation, which is usually carried out by a metal working device. The rotating of the body to be balanced into the working position may take place on the same machine that was used for obtaining the measurements (balancing machine). However, the rotating of the body to be balanced into its working position may be performed on a special balancing machine to which the stored results of the measurements are conveyed. The "working" at the working position may consist in a direct balancing of the unbalance. The working may, however, consist in a marking of the spot where the unbalance occurs for a subsequent balancing operation.

The unbalance of a body to be balanced is usually measured dynamically at two axially displaced, radial planes, the "balance planes" with the aid of a balancing machine. The angular position and magnitude of the unbalance is determined for each of these planes. Force or displacement sensors deliver, via a known electric circuit or computer, a combined AC signal having the same frequency as the body to be balanced for each of these balance planes. The amplitude of the AC signal provides a measure of the magnitude of the unbalance. The phase of the AC signal provides a measure of the angular position of the unbalance. A known process of determining the angular position of an unbalance consists in comparing the AC signal with two reference AC signals which also have the same frequency as that of the body to be balanced and which are phase-locked therewith but which are 90° out of phase with each other. Consequently, the AC signal can be multiplied with each of the reference signals at each time point. Alternatively, each of the reference signals may be used to control a phase-sensitive demodulator and the AC signal can be mixed in the two phase-sensitive demodulators. If the body to be balanced is being driven by a motor which is phase locked with the rotation of the body, e.g. via a Cardan shaft, then the reference signals can be produced by a generator connected to this motor. However, if such a phase-locked type of driving connection is not available and the body to be balanced is being driven by a belt for example, or if the measurements are being taken when coasting, then a mark can be put on the body and this mark can be detected, (e.g. with a photoelectric detector). Such a mark and detector arrangement provides reference signals from which AC or rectangular pulse reference signals can be generated. In this way, one can obtain by suitable mixing of the AC signal and the reference signals (multiplication or pulsed rectification) two values, usually in the form of DC signals, which correspond to the unbalance components. The latter are expressed in terms of points of a co-ordinate system which is defined relative to the body and the angular position of the generator connected to the motor or the angular position of the mark on the body.

It is known to use the thus obtained components to produce a direct indication of the magnitude and angular position of the unbalance on a screen.

In one known indicating arrangement of this type, two watt meters are arranged at a mutual angular spacing of 90° and receive the signals from the sensors sensing the centrifugal force exerted by the body to be balanced during its rotation. The watt meters are provided with mirrors which are also mutually angularly offset by 90°. A light beam is directed to the two mirrors during rotation of the body to be balanced. The reflected light beam is directed to a diffused plate, e.g. ground glass screen, having a polar coordinate system inscribed thereon. The light beam is reflected by the two mutually perpendicular mirrors in accordance with the two mutually perpendicular components of the unbalance and generates a resultant point of light at an angular position in the polar magnitude of the unbalance. It is also known in a balancing machine of this type to store the light point indications so that they are maintained even after the ending of the test cycle and the stopping of the apparatus. It is also known to indicate the magnitude and the angular position of the unbalance by means of a cathode ray tube wherein the two signals corresponding to the unbalance components are used to control the electron beam in two mutually perpendicular directions.

In order to rotate the body to be balanced into its working position, a second light mark (position marker) is then created on the same screen. This second mark indicates the rotational positions assumed by the body during the rotating process. When the body has been so rotated that the second mark coincides with the stored mark, then the body is in its working position. This operation is carried out by rotating a projector or mirror conjointly with the body to be balanced. This projector or mirror is coupled in phase-locked relationship to the drive motor rotatingly driving the body to be balanced, by means of an "electric shaft" i.e. a rotating field system transmitter and receiver. The transmitter has a rotor which is coupled to the drive motor and the receiver has a rotor which is coupled to the projector or mirror. This system requires that the drive motor is coupled in phase-locked relationship to the body to be balanced.

If no such phase-locked driving connection is available, other systems are known for monitoring the rotation of the body to be balanced into its working position for correcting the unbalance. Such systems which are known from European Patents No. 0,074,416 and 0,085,873, do not rely upon indicating arrangements of the type as described hereinbefore.

From European Patent No. 0,074,416, a balancing machine is known in which a body to be balanced is driven by a belt, i.e. the drive motor does not rotate synchronously with the body. A pulse generator is coupled to the motor. A mark on the body to be balanced is detected by a pick-up device and delivers a reference signal at each revolution of the body. A counter counts the number of pulses generated by the pulse generator between each occurrence of a reference signal. In this way, the number of pulses corresponding to a full revolution of the body is determined. By multiplying this number by the ratio of the measured rotational angle of unbalance and 360°, the number of pulses corresponding to the angle of unbalance is obtained. Thereafter, the body to be balanced is rotated into its working position in which the reference mark is located at the working position. The body to be balanced is, then, further rotated until the counted pulse number is equal to a stored pulse number representative of the angular position of the unbalance relative to the reference mark or until such stored pulse number is counted down to zero.

From European Patent No. 0,085,873, a balancing machine is also known in which a pulse generator is coupled to an idler roller of the balancing machine. A mark is made on the body to be balanced. This mark is detected by a pick-up device and thereby produces a reference pulse. A measurement pulse is derived from the AC signal. The phase of the measurement pulse relative to the reference pulse provides an indication of the angular location of the unbalance relative to the mark. During a test cycle, the pulses emanating from the pulse generator are counted from the occurrence of the reference pulse up to the appearance of the measurement pulse. The resultant count is stored. The rotating of the body to be balanced is then accomplished with the aid of the pulse generator in accordance with the count.

The balancing machines according to European Patents No. 0,074,416 and 0,085,873 rely upon pulse counting and count comparison operations for rotating the body to be balanced into the working position. Due to the lack of a phase-locked driving connection between the rotary drive means and the body to be balanced, the aforenoted screen displaying functions can not be employed in such balancing machines for indicating the rotation of the body to be balanced into the working position for correcting the balance.

Also, there exist a number of cases in which a phase-locked driving connection between the body to be balanced and the rotary drive means would be undesirable for measuring and correcting the unbalance because the Cardan shaft which provides the phase-locked driving connection, would affect the result of the measurements due to the occurrence of laterally directed forces. In such cases it would be highly desirable to carry out such measuring and correcting operations without making use of the phase-locked driving connection even if it is present.

SUMMARY OF THE INVENTION

Therefore, with the foregoing in mind, it is a primary object of the present invention to provide a new and improved method of, and apparatus for, correcting an unbalance and which method and apparatus are not afflicted with the drawbacks and limitations of the prior art heretofore discussed.

Another and more specific object of the invention is directed to providing a new and improved method of, and apparatus for, correcting an unbalance and which method and apparatus permit precisely indicating on a screen the working position of the body to be balanced for correcting the unbalance regardless of whether there exists a phase-locked driving connection between the rotary drive means and the body to be balanced.

Now, in order to implement these and still further objects of the invention which will become more readily apparent as the description proceeds, the method of the present development is manifested by the features that, among other things, an unbalance present in the body to be balanced is measured relative to a reference mark on the body to be balanced and the magnitude and the angular position of the measured unbalance are indicated by displaying and storing a first visible mark on a screen; a signal generator is coupled to a part which rotates conjointly with the body to be balanced and thereby produces a pulse train during operation of the rotary drive means; the body to be balanced is placed into a predetermined starting position for rotating the body to be balanced into a working position; the pulses of the pulse train produced by the signal generator are processed, during the rotation of the body to be balanced into the working position, as a function of the pulse number N of pulses, which are produced during one full revolution of the body to be balanced, for producing output signals representative of the momentary rotational positions of the body to be balanced; the output signals are fed to a screen control for indicating the momentary rotational positions of the body to be balanced by a second visible mark on the screen conjointly with the first visible mark.

As alluded to above, the present invention is not only concerned with the method aspects but also relates to an apparatus for correcting an unbalance. Accordingly, the inventive apparatus comprises, among other things, measuring means for measuring an unbalance of the body to be balanced relative to a reference mark applied to the body to be balanced; a signal generator which is coupled to a part rotating conjointly with the body to be balanced and which produces a pulse train during operation of the rotary drive means; the signal generator is connected to signal processing means and supplies thereto the pulse train produced by the signal generator; signal processing means receiving reference pulses from a reference mark detector, determines the number N of pulses of the pulse train which number N is indicative of one full revolution of the body to be balanced, and produces, from the pulses of the pulse train, output signals which are a function of the pulse number N and which are representative of the momentary rotational positions of the body to be balanced; a screen control circuit receiving the output signals from the signal processing means for displaying on the screen conjointly with a first visible mark, which indicates the magnitude and the angular position of the unbalance as measured relative to the reference mark, a second visible mark indicating the momentary rotational positions of the body to be balanced such that the body to be balanced assumes its working position for correcting the unbalance upon coincidence of the first and second visible marks.

The signal generator is, of course, coupled to a part which is rotating with the body to be balanced, e.g. the drive motor of the belt or an idler roller, but not necessarily rotating in synchronism with the body. From the signals obtained from the signal generator which give an indication of the direction of rotation, and from the reference signal, processing means produces a signal indicative of the current position of the body. For example, pulses, produced by the signal generator between two successive reference signals corresponding to a full rotation of the body to be balanced, are counted and thus define a full-rotation signal. The number of pulses following the occurrence of a reference signal, i.e. a number corresponding to the momentary rotational position of the body divided by the pulse number corresponding to a full rotation and multiplied by 360, provides a position-indicating signal which is independent of the type of body to be balanced. This position-indicating signal is then fed to the control circuit for producing a position-indicating visible mark on the screen of the CRT.

An exemplary embodiment of the invention will now be described with reference to the drawings.

THE DRAWINGS

DETAILED DESCRIPTION OF THE ILLUSTRATED EMBODIMENTS

Figure 1:
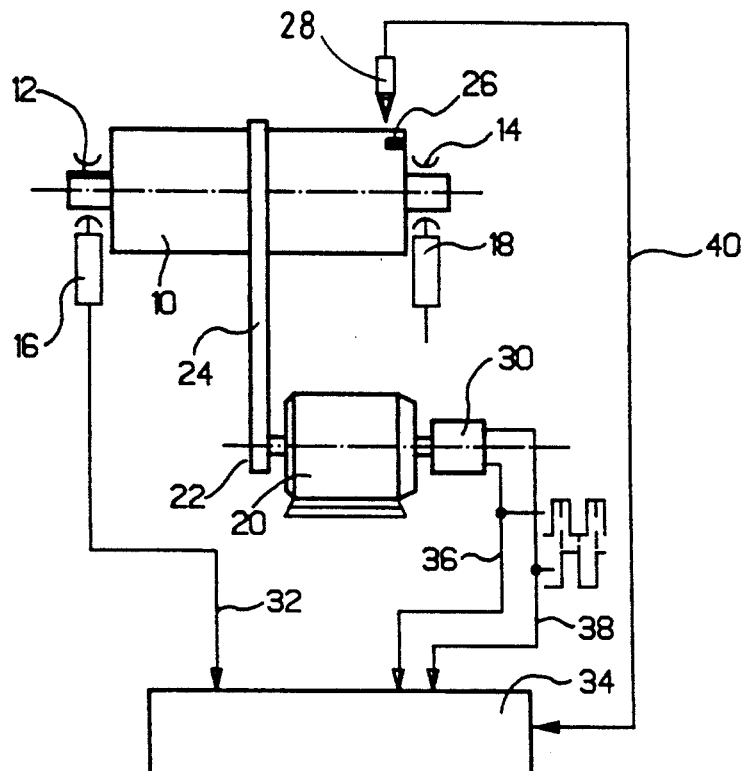
FIG. 1 illustrates in schematic form a balancing machine having an apparatus for rotating a body to be balanced into a working position.

A body to be balanced 10 mounted in bearings 12 and 14 as depicted in FIG. 1. The bearings 12 and 14 are each arranged in known manner on unbalance means providing a resilient bridge which is supported by force measuring transducers 16 and 18. The transducers 16 and 18 produce AC signals which correspond to the forces exerted on the bearings as a result of any unbalance. The unbalances are usually determined in respect of two measuring planes which are different from the planes in which the bearings are located. The signals to be used for further processing are derived by a linear transformation from those actually measured in the bearing planes by transducers 16 and 18. This is a known procedure and so, for simplicity, will not be further described. Only one AC signal, the one emitted by transducer 16, will be considered here. The body 10 to be balanced is driven by rotary drive means comprising a drive motor 20, a belt 24, and an idler roller 22. It is self-evident that the drive shaft of the motor 20 and the body 10 to be balanced do not rotate phase synchronously. Their revolution ratio depends on the ratio between the diameters of the roller 22 and the body 10 at the point where it contacts the belt 24.

A reference mark 26 is provided on the body to be balanced 10. The reference mark 26 is detected by a pick-up or reference mark detector device 28, which is stationarily arranged relative to the body to be balanced and generates a reference signal whenever the reference mark 26 passes the reference mark detector 28 during rotation of the body 10 to be balanced.

A pulse or signal generator or decoder 30 is coupled to a part of the balancing machine which rotates conjointly with the body 10 to be balanced, in the illustrated embodiment the drive motor 20, and produces two rectangular pulse trains which are relatively phase shifted by a quarter of a period.

The AC signal from the transducer 16 is transmitted over lead 32 to a first computer 34 of signal processing means 34,46. The two relatively phase shifted rectangular pulse trains from the generator 30 are transmitted via leads 36 and 38 to the computer 34. Finally, the computer 34 receives the reference signal from the pick-up device 28 via a lead 40. The computer processes the reference signal from the pick-up device 28 and the AC signal from the transducer 16 and delivers, via its output 42, output unbalance-related signals which correspond to the components of unbalance (in the plane of the bearing 12). This is known and consequently will not be described herein detail.

In addition, the computer 34 processes the reference signal from the pick-up device 28 and the rectangular pulse trains from the generator 30 to provide a position-indicating signal at its output 44 which indicates the current position of the body 10 to be balanced.

For this purpose, the computer 34 functions as follows:

During the test cycle, the number of pulses emanating from one input of the generator 30, between the occurrence of one reference signal from the pick-up device 28 and the next are counted. This is the "revolution signal count" i e. the number N of pulses corresponding to a full revolution through 360° of the body to be balanced. This "revolution signal count" is stored. After the test cycle is ended, the number of rectangular pulses emanating from the generator 30 whilst the body 10 to be balanced is being rotated into its working position are counted in accordance with the direction of rotating. Such a direction-dependent count is made possible by virtue of the two displaced rectangular pulse trains. The ratio of the number n of pulses thus obtained, i.e. the "position signal count" to the "revolution signal count" is therefore, independent of the diameter of the body 10 in the vicinity of the belt 24 and a measure of the angle through which the body 10 has been rotated. The ratio "1" corresponds to a rotating through 360°. If one multiplies this ratio by 360° then one obtains directly the angle through which the body 10 has been rotated from the null position, which was determined by the pick-up device 28 on encountering the mark 26. The product of 360 and the ratio between the position signal count and the revolution signal count, corrected if need be by the angle between the pick-up device 28 and the metal working device, is therefore provided as a momentary rotational position-indicating signal at the output 44.

The unbalance components from the output 42 of the computer 34 are transmitted to a further or second computer 46 of the signal processing means 34,46 which computer 46 is connected to a cathode ray (CRT) tube 48 having a screen 50 through a CRT screen control circuit 58.

The computer 46 controls the CRT 48 such that a polar coordinate system 52 having a point of origin 54 appears on the screen 50.

The unbalance components on output 42 are subjected to hardware and software processing in the computer 46 so as to provide an indication of the measured unbalance on the screen 50. In FIG. 1, this is represented by the software block 56. The unbalance-related signals obtained in this way are coupled to the control circuit 58 for the screen display. Thereby, a first visible mark 60 in the form of a point of light is generated. The distance of the visible mark 60 from the origin corresponds to the magnitude of the unbalance. The angle between a vertical line drawn through the origin "0" and a radius passing through the visible mark 60 corresponds to the reference angular position of the unbalance relative to the mark 26.

Similarly, the position-indicating signal on the output 44 is fed to the computer 46.

By means of software processing, as represented schematically by block 62, the co-ordinates are calculated for a point 64 (not specifically shown) on the outermost circle of the polar coordinate system 52, which point corresponds to the current position of the body to be balanced. By means of a further software process, schematically represented by the block 66, a line is produced on the screen which radially passes through the origin and the calculated point 64. This is a second visible mark in the form of a (clock-like) radial finger 68. When the body 10 has been moved through a further angle, as is indicated by the train of pulses coming from the pulse generator 30, the software block 62 calculates a new point 64. Then, erasing means, as represented schematically by software block 70, erases the original position-indicating, radial finger 68, which is replaced by a new radial finger 68 passing through the newly calculated point 64.

The displaying of the stepwisely moving, radial finger 68 recurs in very closely spaced steps, so that the finger 68 rotates quasi-continuously with the rotating of the body 10 to be balanced. As the body 10 is rotated, the calculated point 64 runs around the origin along the outermost circle of the polar co-ordinate system 52 assuming successive positions in sequence. The position-indicating finger 68 rotates synchronously with the calculated point 64 and thus with the body 10 to be balanced.

The body 10 is rotated until the position-indicating finger 68 reaches the center of the first visible mark 60. The body 10 to be balanced is then in its proper working position.

The position-indicating finger 68 is erased as soon as a further unbalance correcting operation of the balancing machine is started. The finger 68 is also erased as soon as a computer key is actuated to start a program for the computer 46 for which the display of the finger is not necessary.

The apparatus described above suffers, in a manner similar to that of the already discussed prior art apparatus using a light indicator, from the problem that the accuracy with which the body can be positioned decreases in proportion to the decrease in the magnitude of the unbalance due to the progress being made in correcting for the unbalance. The visible mark 60 then gets closer and closer to the origin 54. This problem can be overcome by the measures described below:

When processing the unbalance data appearing at the output 44 of the computer 34 in the computer 46, the angular position of the unbalance relative to the reference mark 26 is determined with high accuracy even in the case of small unbalances. Thus, it is possible during the test cycle to carry out a plurality of individual measurements and store them in the computer 34. Average values can be determined from the individual measurements. As a result, very exact values for the unbalance components are obtained. The angular position can then be calculated with a corresponding accuracy from these components.

Figure 2:
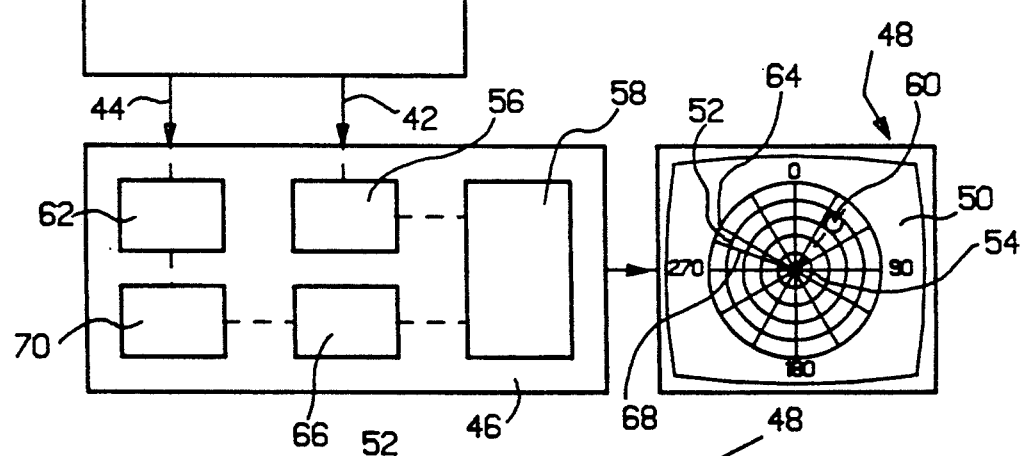
FIG. 2 depicts the screen in a modified embodiment.
Figure 2:
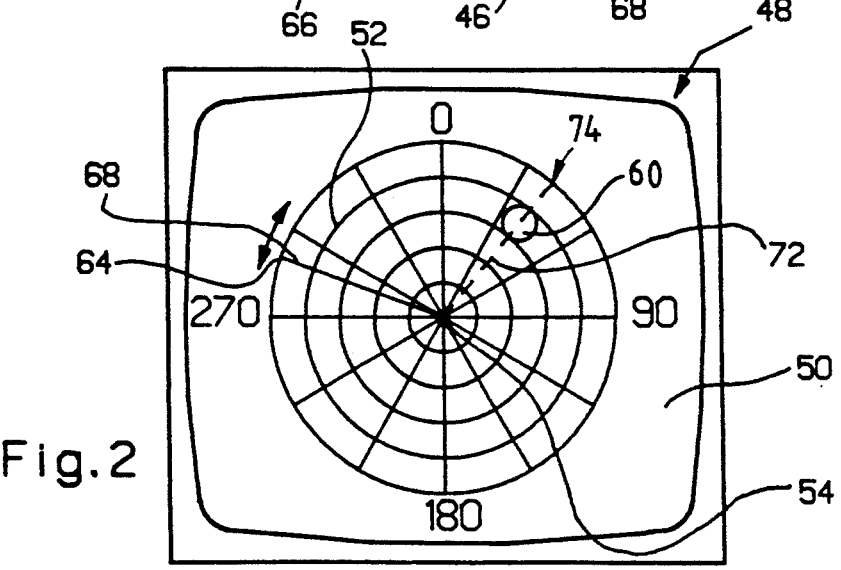

Once the angular position of unbalance has been determined in this way, then there can be made to appear on the screen 50 of the CRT 48 a third visible mark in the form of a radial finger 72, as in FIG. 2, which extends from the origin through the calculated point 60 representing the magnitude and angular position of the unbalance as determined relative to the reference mark 26. The finger 72 may extend to the outermost circle of the polar coordinate system 52 independently of the magnitude of the unbalance. It is also possible, as shown in FIG. 2, to produce the third mark, e.g. in the form of an arrow 74, at that position on the outermost circle of the polar co-ordinate system which corresponds to the angular position of the unbalance. This arrow 74 thus indicates the angular position of the unbalance with great accuracy. The first visible mark 60, which represents the magnitude and angular position of the unbalance, is also displayed on the screen 50. The visible mark 60 serves to show the magnitude and general position of the unbalance. However, the mark 60 no longer has the function of indicating when the body 10 to be balanced has reached its working position. On the contrary, now in order to exactly rotate the body 10 to be balanced into its working position, it and the synchronously rotating second visible mark in the form of the position-indicating radial finger 68 are rotated until the radial finger 68 coincides with the third mark in the form of the radial finger 72 or the arrow 74, as the case may be, which indicates the angular position of the unbalance. Once this occurs, the body 10 to be balanced is in its working position.

In the preferred embodiment shown in FIG. 2, the CRT 48 is a color tube having a color screen 50. The two radial fingers 68 and 72 representing the second and the third visible marks, respectively, are displayed in different colors. When the radial fingers 68 and 72 coincide, there results a clearly visible change of color. In this way, a very high degree of rotating accuracy is obtained.

The displaying of the unbalance and the rotating of the body 10 to be balanced for the second balancing plane is effected in a similar manner.

Instead of using the pulse or signal generator 30, the direction-dependent pulse trains may be generated in the following manner: a stepping motor is used as the drive motor 20 for driving the body 10 to be balanced. The pulse or signal generator contains a circuit which is activated by the driving pulses for the stepping motor. This circuit delivers signal trains which permit of discrimination between the two directions.

A further possible modification consists in passing the belt 24 over a direction-changing roller. The pulse generator 30 is then coupled to this roller.

While there are shown and described present preferred embodiments of the invention, it is to be distinctly understood that the invention is not limited thereto, but may be otherwise variously embodied and practiced within the scope of the following claims.

We claim:

1. Apparatus for locating unbalance in a rotary body to be balanced, comprising:
   means for supporting the body for rotation about its axis of rotation;
   means for rotating the body as so supported;
   means for determining the angular position of unbalance of the body with respect to a reference position thereof;
   means for displaying on a screen a mark representing the so-determined angular position of unbalance;
   means for generating electrical pulses during rotational movement of the body such that the numbers of pulses generated during given angles of rotation of the body are proportional to such angles of rotation of the body, whereby trains of pulses are generated by rotational movement of the body from said reference position to respective sequential momentary positions thereof an a train of pulses is generated when the body rotates through a complete revolution of the body;

means for determining the respective ratios of the numbers of said pulses in the respective trains of pulses that are generated by rotational movement of the body from said reference position thereof to said sequential momentary positions thereof in relation to said number of pulses generated in said train of pulses during a complete revolution of the body; and means for utilizing said ratios to sequentially display on said screen respective momentary rotational positions of the body.

2. Apparatus according to claim 1, wherein:

a reference mark is associated with the body to be balanced for rotary movement therewith;

the means for determining the angular position of unbalance comprise a reference mark detector arranged to detect said reference mark as the body rotates and to produce an electrical reference signal each time said reference mark passes by; signal generating means associated with the body supporting means so as to generate electrical signals indicative of unbalance of the body as it rotates; means coupled to the body-rotating means for generating electrical pulses as the body is rotated; and signal processing means arranged to receive the reference signals and the pulses and to produce unbalance-related electrical signals representative of the magnitude and the angular position of said unbalance;

the means for displaying on a screen comprise a screen and a screen control circuit connected to said signal processing means for receiving therefrom said unbalance-related signals so as to store and to display on said screen a first visible mark indicating the magnitude and the angular position of the unbalance of said body;

the means for determining the respective ratios of the number of pulses generated in relation to the number of pulses in a complete revolution of the body comprise information processing devices for receiving and processing said reference signals produced by said reference mark detector and the number, "N" of pulses representing one full revolution of the body to be balanced to produce output signals which are a function of said pulse number "N" and are representative of sequential momentary rotational positions of said body; and the means for utilizing the ratios comprise additional information processing devices arranged to receive said output signals from the first-mentioned information processing devices and for feeding processed signals through said screen control circuit to said screen for conjointly displaying on said screen said first visible mark and, sequentially thereon, a second visible mark that indicates said momentary rotational positions of said body to be balanced, and, when coincident with said first visible mark, indicates the working position for removing the unbalance.

3. Apparatus according to claim 2, wherein the screen is provided with a polar coordinate system and the second visible mark is in the form of a finger extending radially in said polar coordinate system.

4. Apparatus according to claim 3, wherein:

the signal processing means and the screen control circuit are constructed and arranged to produce, store, and display on the screen a third visible mark in the form of a radial finger extending radially in the polar coordinate system and assuming an angular position therein which is indicative of the angular position of unbalance.

5. Apparatus according to claim 4 wherein:

the screen is a color screen; and the radial fingers constituting the second and third visible marks, are produced in respectively different colors such that coincidence of said radial fingers on the screen produces a visible color change.

6. Apparatus according to claim 4, wherein the second visible mark is displayed on the screen as a point located on a circle of the polar coordinate system that surrounds the origin of said system and assumes successive angular positions corresponding to the momentary rotational positions of the body to be balanced.

7. Apparatus according to claim 2, wherein the means for generating the pulses is constructed and arranged to produce two pulse trains at a mutual phase offset for discriminating between opposite directions of rotation of the body rotating means.

8. Apparatus according to claim 7, wherein:

the body-rotating means is a stepping motor driven by electrical pulses which constitute the pulse trains and enable discrimination between opposite directions of rotation of said stepping motor.

9. Apparatus according to claim 2, wherein the ratio determining means are constructed and arranged to produce electrical output signals having values of 360 n/N, wherein "n" equals the number of pulses produced during rotation of the body to be balanced from a starting position to a momentary rotational position, and wherein "N" represents the number of pulses produced during one full revolution of the body to be balanced.

10. A method for locating unbalance in a rotary body to be balanced, comprising the steps of:

mounting the body for rotation about its axis of rotation;

rotating the body as so mounted;

determining the angular position of unbalance of the body with respect to a reference position thereof;

displaying on a screen a mark representing the angular position of unbalance of the body as so determined;

generating electrical pulses during rotational movement of the body such that the number of pulses generated during given angles of rotation of the body are proportional to such angles of rotation of the body, whereby trains of pulses are generated by rotational movement of the body from said reference position to respective sequential momentary positions thereof and a train of pulses is generated when the body rotates through a complete revolution of the body;

determining the respective ratios of the numbers of said pulses in the respective trains of the pulses that are generated by rotational movement of the body from said reference position thereof to said sequential momentary positions thereof in relation to the number of pulses generated in said train of pulses during a complete revolution of the body; and utilizing said ratios to sequentially display respective momentary rotational positions of the body.

11. Apparatus for rotating a body to be balanced (10) into a working position for correction of unbalance, said body having a reference mark (26) phase-locked thereon, and said apparatus comprising:

means (12, 14, 16, 18) for rotatably supporting said body and for generating and transmitting unbalance-indicating signals in accordance with forces exerted by reason of the unbalance;

rotary drive means (20, 22, 24) for rotating the body;

a reference signal generator (28) arranged relative to said body for generating reference pulses during rotation of said body that are indicative of the extent of rotation of said body;

signal generating means (30) phase-lockingly coupled to said drive means and rotatable conjointly therewith for producing signal pulses indicative of the direction of and the amount of rotational movement of said drive means relative to said reference mark;

a first indicating device (34) having signal-processing means for receiving said unbalance-indicating signals, said reference pulses, and said signal pulses, and for processing them to produce and to transmit (42) unbalance signals and to produce and to transmit (44) position-indicating signals indicative of momentary rotational positions of unbalance of said body;

a second indicating device (46) having signal-processing means (56, 62, 66, 70) for receiving and processing output signals (42, 44) from said first indicating device to produce and transmit, through control means (58) to electronic display means (48), signals that cause to be displayed visible marks on a display screen of said electronic display means;

electronic display means (48) in the form of a color cathode ray tube for receiving signals from said second indicating device (46), said tube having a display screen (50) defining a polar co-ordinate system (52) that provides a radial scale having a center (54); and said signal-processing means of said first (34) and of said second (46) indicating device and said control means serving to produce and feed to said electronic display means (48) signals that cause to be simultaneously displayed, on said screen (50) thereof in color during rotation of said body, visible marks which include a radial finger (68) indicative of the momentary rotational position of said body (10) and a radial finger (72) whose angular position corresponds to the angular position of unbalance, said fingers being displayed in different colors, respectively, that, upon coincidence of said fingers on said display screen (50), result in a visible change of color which is indicative of the working position of said body (10) for correction of the unbalance.

* * * * *